Feb. 15, 1949     A. N. GRAY     2,461,600
APPARATUS FOR VULCANIZING ARTICLES
Filed Jan. 11, 1945     2 Sheets-Sheet 1
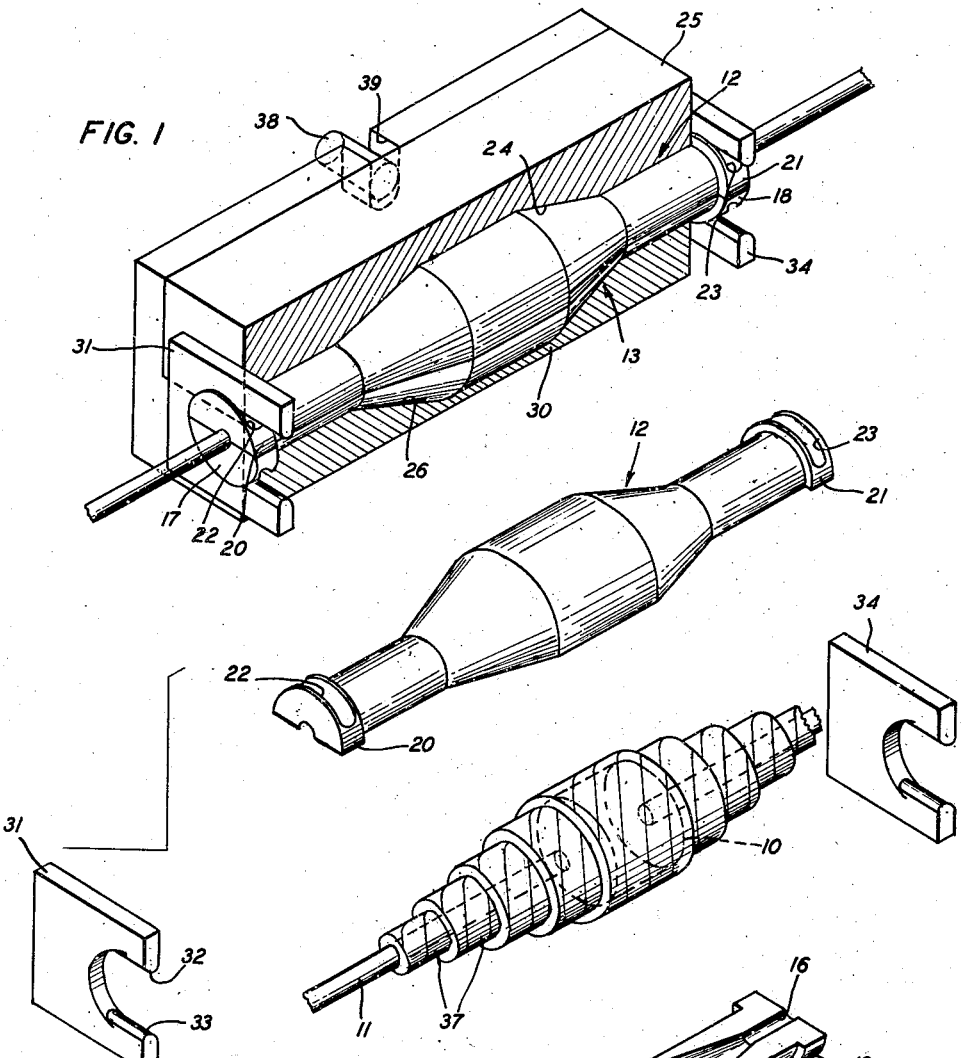
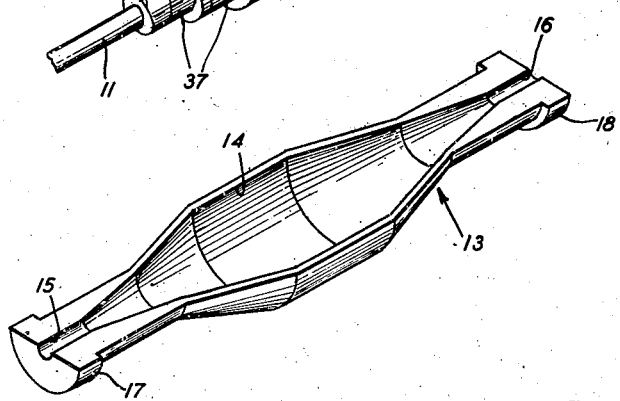
INVENTOR.
A. N. GRAY
BY
ATTORNEY

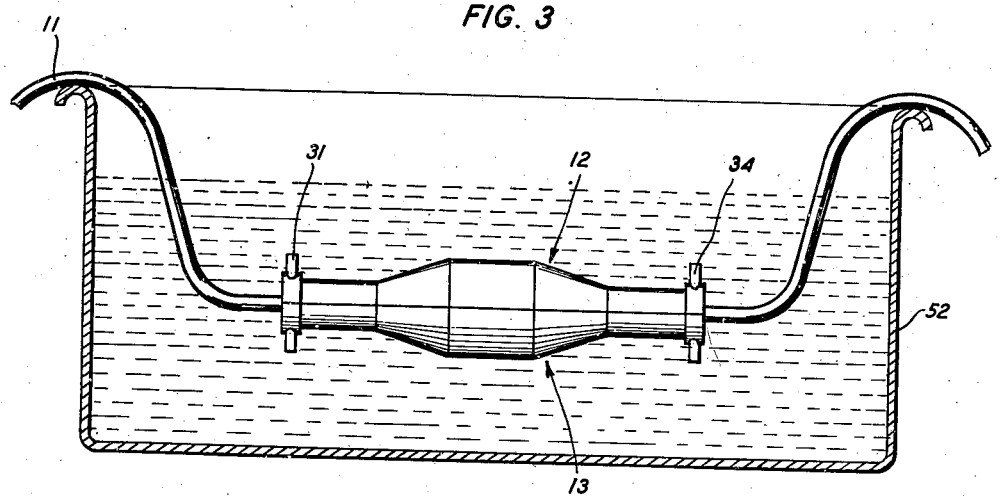
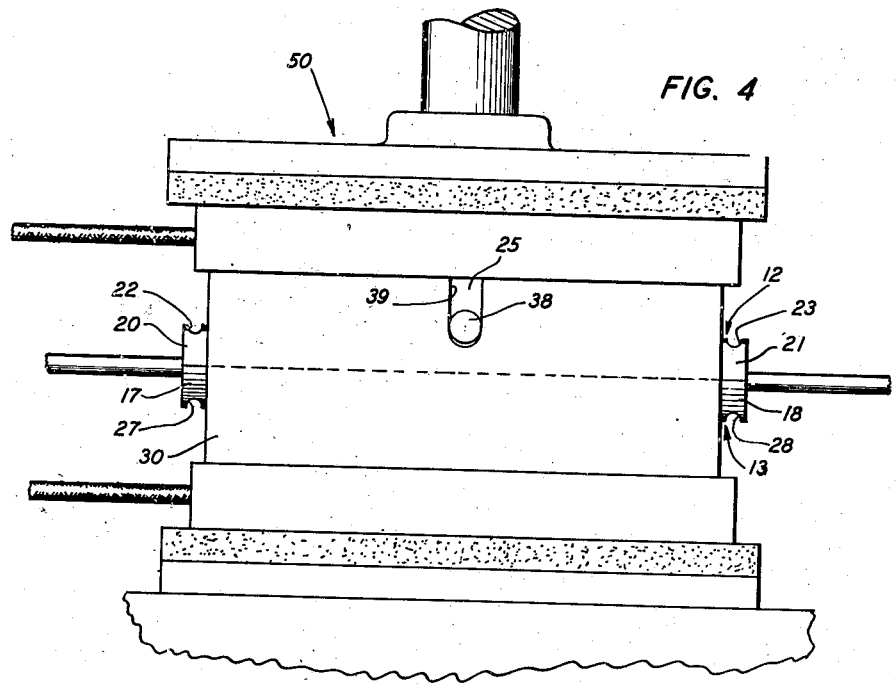
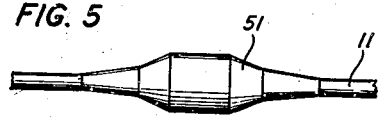

Patented Feb. 15, 1949

2,461,600

UNITED STATES PATENT OFFICE 2,461,600

APPARATUS FOR VULCANIZING ARTICLES

Alvin N. Gray, Joppa, Md., assignor to Western Electric Company, Incorporated, New York, N. Y., a corporation of New York Application January 11, 1945, Serial No. 572,324

3 Claims. (Cl. 18—43)

This invention relates to apparatus for vulcanizing articles.

In the manufacture of field cables having loading coils thereon, the coils are placed upon the cables and a protective covering of insulating material is formed and vulcanized thereover. During the vulcanization of the covers they are subjected to great compression and high temperatures and heavy mold sections must be used to perform this operation. As a result of the vulcanization step, hot gases are formed in the material being vulcanized and if such heavy mold sections are opened after a vulcanizing operation before the hot gases are cooled, the gases will burst the vulcanized material. If the mold sections are kept closed until the gases in the vulcanized material are cooled, the heavy mold sections also are cooled and must be reheated for another vulcanizing operation, which causes the vulcanizing operation to be time consuming and costly.

An object of the invention is to provide new and improved apparatus for vulcanizing articles.

One apparatus embodying the invention comprises a pair of heavy mold sections having recesses formed therein, a pair of complementary shells which are designed to fit into the recesses, and means for clamping the shells together.

A complete understanding of the invention may be obtained from the following detailed description of an apparatus forming specific embodiments thereof, when read in conjunction with the appended drawings, in which:

Fig. 1 is a partially sectional, perspective view of an apparatus embodying the invention;

Fig. 2 is an exploded, perspective view of a portion of the apparatus;

Fig. 3 is a vertical, sectional view of a cooling tank for carrying out a step of a method effected by the apparatus and a portion of the apparatus;

Fig. 4 is a fragmentary, front view of the apparatus in a vulcanizing press, and Fig. 5 is a view of an article produced by the apparatus.

Referring now in detail to the drawings, there is shown therein an apparatus for forming an insulating and weatherproofing cover around a loading coil 10 (Fig. 2) positioned on a cable 11, which apparatus includes identical thin shells 12 and 13. The shell 13 provided with an enlarged molding cavity 14 tapering to cylindrical grooves 15 and 16 at the ends thereof has flanges 17 and 18 formed on the ends thereof. The shell 12, which has a molding cavity (not shown) identical with the molding cavity 14 and grooves identical with the grooves 15 and 16 formed therein, is provided with flanges 20 and 21 on the ends thereof. The flanges 20 and 21 have slots 22 and 23, respectively, formed therein and similar slots 27 and 28 (Fig. 4) are formed in the flanges 17 and 18.

The shell 12 (Fig. 1) is designed to fit closely into a recess 24 formed in a heavy top mold section 25, and the shell 13 fits closely into a recess 26 formed in a heavy bottom mold section 30. A U-shaped clamp 31 (Figs. 1 and 2) having tongues 32 and 33 formed thereon can be slid over the flanges 17 and 20 to clamp the shells 12 and 13 together, when desired. A U-shaped clamp 34, identical with the clamp 31, is adapted to clamp the flanges 18 and 21 together in a manner similar to that in which the clamp 31 clamps the flanges 17 and 20 together.

Pins 38—38 (Figs. 1 and 4) projecting from opposite sides of the top mold section fit into notches 39—39 formed in the lower mold section when the mold sections are assembled together. The pins and the notches serve to align the mold sections so that the recesses 24 and 26 are aligned when the mold sections are assembled together.

In the operation of the apparatus described hereinabove, the shell 13 is placed in the recess 26 in the bottom mold section 30, and strips 37—37 of vulcanizable material such as a rubber or rubber-like compound are wrapped around the loading coil 10 mounted on the cable 11 and around the portions of the cable adjacent to the loading coil. The strips 37—37 of vulcanizable material, the loading coil 10 and the cable 11 are placed in the cavity 14 with the cable 11 resting in the grooves 15 and 16. The shell 12 then is placed in the recess 24 in the top mold section 25. The shell 12 fits snugly into the recess 24 and the friction therebetween prevents the shell 12 from accidentally falling out of the recess during movement of the shell and the top mold section. However, when it is desired to remove the shell 12 from the recess 24, the shell may be removed with ease.

The mold section 25 and the shell 12 then are moved over the loading coil 10 and the cable 11. As the top mold section is placed over the lower mold section, the pins 38—38 fit into the notches 39—39 formed in the lower mold section, whereby the mold sections and the shells are aligned. The entire assembly then is placed in a suitable vulcanizing press 50 (Fig. 4), which presses the top mold section 25 toward the bottom mold section 30 and heats the mold sections 25 and 30 to a high temperature, whereby the mass of vulcanizable material is vulcanized under pressure.

After the strips 37—37 have been molded into a single mass 51 (Fig. 5) of vulcanized material, the clamp 31 (Fig. 2) is placed over the flanges 17 and 20 to clamp these flanges together, and the clamp 34 is placed over the flanges 18 and 21 to clamp those flanges together. The press 50 (Fig. 4) then is opened, and the entire assembly is withdrawn from the press. The mold 25 then is raised from the shell 12 and the shells 12 and 13 are lifted from the mold section 30. The shells 12 and 13, while they still are clamped together by the clamps 31 and 34, are inserted in a tank 52 (Fig. 3) containing a quantity of water, whereby the vulcanized mass of vulcanizable material is cooled and any hot gases contained in the mass of vulcanizable material are cooled so that the gases will not burst the vulcanizable material when the shells 12 and 13 are removed therefrom.

An alternate set of shells (not shown) which are identical with the shells 12 and 13 then are placed in the hot mold sections 25 and 30 and the shells and mold sections are assembled over another cable and loading coil wrapped with strips of vulcanizable material. This assembly then is placed in the press, and the press is closed to vulcanize the last-mentioned strips of vulcanizable material.

After the mass of vulcanizable material has been cooled, the clamps 31 and 34 are removed from the flanges 17 and 20, and 18 and 21, respectively, and the shells 12 and 13 are separated. The molded article then is removed from the shells, after which another molding operation similar to that described hereinabove may be conducted with the shells 12 and 13 being substituted for the alternate set of shells. If necessary, more than one alternate set of shells may be used with the mold sections 25 and 30.

In the operation described hereinabove, only the thin shells 12 and 13 or the alternate set or sets of shells are cooled, and when another molding operation is started, the thin shells are the only portions of the apparatus which must be reheated from a low temperature, the heavy mold sections 25 and 30 retaining almost all of the heat of the previous vulcanizing operation. However, the shells serve to maintain the mass of vulvanizable material under a high pressure after the material has been vulcanized so that any gases formed in the article being vulcanized as it is heated by the vulcanizing operation are not free to burst through the mass of vulcanizable material prior to the cooling step. When the article is cooled, the gases are cooled and do not burst the cover of vulcanized material after the shells 12 and 13 are removed therefrom.

What is claimed is:
1. In a molding apparatus including a pair of heavy mold sections having elongated recesses formed therein, means comprising a pair of thin rigid inserts fitting into the recesses and extending beyond the ends of the mold sections, said inserts having complementary molding cavities formed therein and being removable from the heavy mold sections, and means for clamping the ends of the inserts together so that the inserts are held together as they are removed from the heavy mold sections.

2. In a molding apparatus including a pair of complementary mold sections having complementary recesses formed therein, the improvement which comprises a pair of rigid shells having flanges on the ends thereof and designed to fit closely into the recesses with the flanges projecting beyond the recesses, said shells having complementary molding cavities formed therein for retaining the elements of an article to be molded therein, said flanges being provided with grooves therein, and a pair of U-shaped clamps designed to enter the grooves in the flanges for clamping the shells together at the flanges thereof.

3. In a molding apparatus including a pair of complementary mold sections having complementary elongated, tapered recesses formed therein, the improvement which comprises a pair of rigid shells having flanges on the ends thereof, designed to fit closely into the recesses with the flanges extending beyond the recesses, said shells having complementary molding cavities enlarged at the central portions thereof, tapering to semicylindrical grooves at the ends thereof and also being provided with grooves in the flanges thereof for providing clearance for a core, and a pair of U-shaped clamps for clamping the shells together at the flanges thereof.

ALVIN N. GRAY.

REFERENCES CITED

The following references are of record in the file of this patent:

UNITED STATES PATENTS

| Number | Name | Date |
| --- | --- | --- |
| 484,345 | Smith | Oct. 11, 1892 |
| 1,332,046 | Kempton | Feb. 24, 1902 |
| 1,438,160 | State | Dec. 5, 1922 |
| 1,481,895 | Gammeter | Jan. 29, 1924 |
| 1,935,794 | Geyer | Nov. 21, 1933 |
| 2,317,597 | Ford et al. | Apr. 27, 1943 |
| 2,329,867 | Whitehead | Sept. 21, 1943 |
| 2,336,578 | Skoning | Dec. 14, 1943 |